US011792490B2

(12) United States Patent
Ogle et al.

(10) Patent No.: US 11,792,490 B2
(45) Date of Patent: *Oct. 17, 2023

(54) CONTENT MANAGEMENT SYSTEM AND METHOD FOR USE OF SAME

(71) Applicant: Enseo, LLC, Plano, TX (US)

(72) Inventors: Vanessa Ogle, Fairview, TX (US); William C. Fang, Plano, TX (US)

(73) Assignee: Enseo, LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/828,869

(22) Filed: May 31, 2022

(65) Prior Publication Data

US 2022/0295156 A1    Sep. 15, 2022

Related U.S. Application Data

(63) Continuation of application No. 17/153,467, filed on Jan. 20, 2021, now Pat. No. 11,350,181, which is a continuation of application No. 16/511,326, filed on Jul. 15, 2019, now Pat. No. 10,904,636, which is a (Continued)

(51) Int. Cl.
| | |
|---|---|
| *H04N 21/6543* | (2011.01) |
| *H04N 21/81* | (2011.01) |
| *H04N 21/234* | (2011.01) |
| *H04N 21/414* | (2011.01) |
| *H04N 21/442* | (2011.01) |
| *H04N 21/45* | (2011.01) |

(52) U.S. Cl.
CPC ... *H04N 21/6543* (2013.01); *H04N 21/23424* (2013.01); *H04N 21/41415* (2013.01); *H04N 21/44213* (2013.01); *H04N 21/44222* (2013.01); *H04N 21/4524* (2013.01); *H04N 21/812* (2013.01)

(58) Field of Classification Search
CPC ......... H04N 21/6543; H04N 21/23424; H04N 21/41415; H04N 21/44213; H04N 21/44222; H04N 21/4524; H04N 21/812
See application file for complete search history.

(56) References Cited

U.S. PATENT DOCUMENTS

| | | |
|---|---|---|
| 6,002,393 A | 12/1999 | Hite et al. |
| 6,601,041 B1 | 7/2003 | Brown et al. |
| 7,328,448 B2 | 2/2008 | Eldering et al. |

(Continued)

*Primary Examiner* — Mulugeta Mengesha

(74) *Attorney, Agent, or Firm* — Scott Griggs; Griggs Bergen LLP

(57) ABSTRACT

A content management system and method for use of same is disclosed. In one embodiment of the system, the set-top box is configured to receive a source signal which includes a stream of network programming having time slots interposed therein. The set-top box detects signaling data indicative of a designated time slot within the network programming and responsive thereto, interposes content stored at the set-top box at the designated time slot within the network programming. The set-top box then forwards the interposed content to the display. Following the forwarding of the interposed content, the set-top box returns to receiving network programming and forwarding the network programming to the display. The set-top box also provides confirmation of the displayed interposed content to a server, which may map the confirmation information.

21 Claims, 12 Drawing Sheets

Related U.S. Application Data continuation-in-part of application No. 16/194,587, filed on Nov. 19, 2018, now abandoned.

(60) Provisional application No. 62/697,657, filed on Jul. 13, 2018, provisional application No. 62/587,795, filed on Nov. 17, 2017.

(56) References Cited

U.S. PATENT DOCUMENTS

| | | |
|---|---|---|
| 7,870,579 B2 | 1/2011 | Haberman et al. |
| 7,987,194 B1 | 7/2011 | Walker et al. |
| 7,992,163 B1 | 8/2011 | Jerding et al. |
| 9,473,814 B1 | 10/2016 | Schlack et al. |
| 9,547,867 B2 | 1/2017 | Sankaranarayanan et al. |
| 10,904,640 B2 | 1/2021 | Ogle et al. |
| 11,284,167 B2 | 3/2022 | Ogle et al. |
| 2004/0003413 A1 | 1/2004 | Boston et al. |
| 2004/0194130 A1 | 9/2004 | Konig et al. |
| 2005/0125290 A1 | 6/2005 | Beyda et al. |
| 2005/0165643 A1 | 7/2005 | Wilson et al. |
| 2006/0107293 A1 | 5/2006 | Ma |
| 2007/0061838 A1* | 3/2007 | Grubbs ............. H04N 21/812 725/35 |
| 2007/0266400 A1* | 11/2007 | Rogers ............. H04N 21/432 725/35 |
| 2008/0127249 A1 | 5/2008 | Cruice |
| 2010/0251289 A1* | 9/2010 | Agarwal ............. H04N 21/458 725/34 |
| 2011/0142417 A1* | 6/2011 | Wilson ............. H04N 21/4408 386/250 |
| 2012/0230652 A1* | 9/2012 | Mirsky ............. H04N 21/8547 386/E9.011 |
| 2013/0347028 A1* | 12/2013 | Warrick ........... H04N 21/41265 725/30 |
| 2014/0026162 A1* | 1/2014 | Cassidy ............. H04H 20/63 725/39 |
| 2017/0094356 A1 | 3/2017 | Mathews et al. |
| 2018/0376197 A1* | 12/2018 | Gonzalez ........... H04N 21/6405 |
| 2019/0158931 A1 | 5/2019 | Ogle et al. |

\* cited by examiner

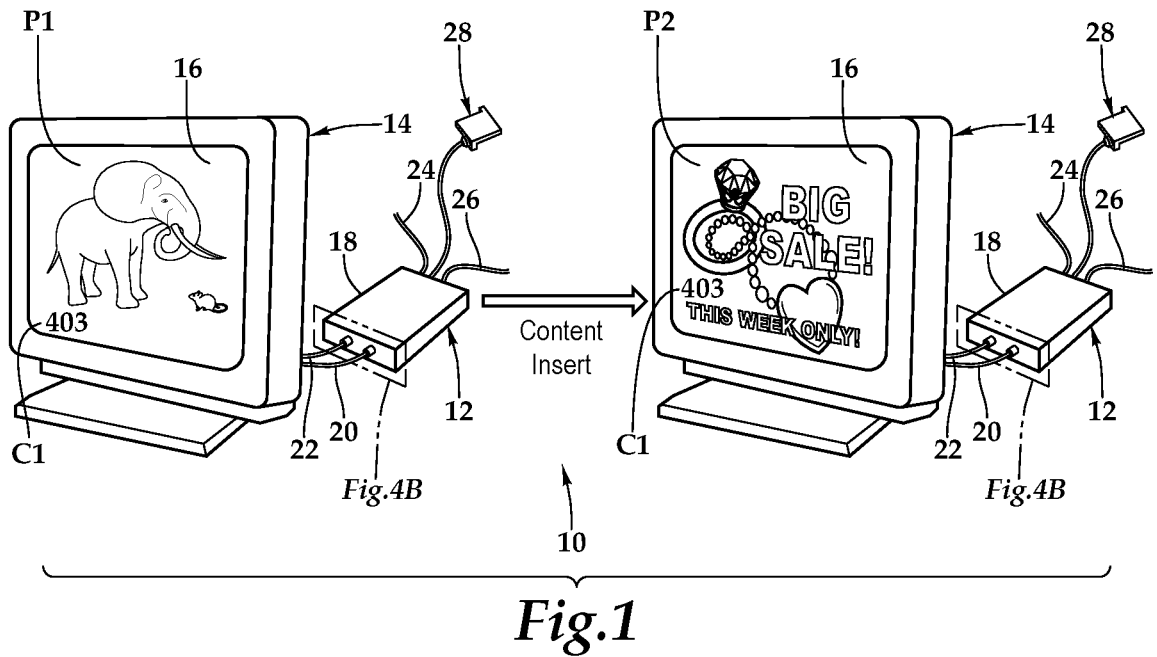
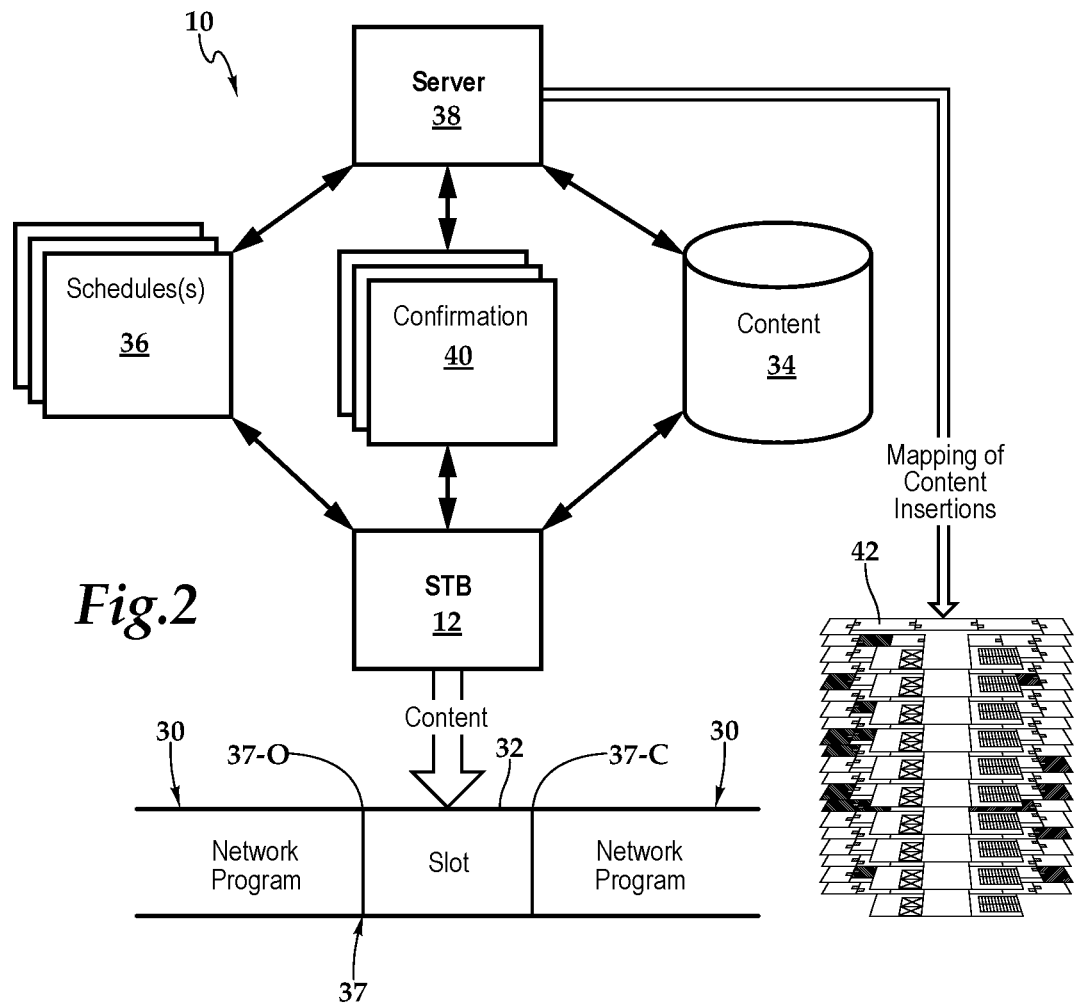

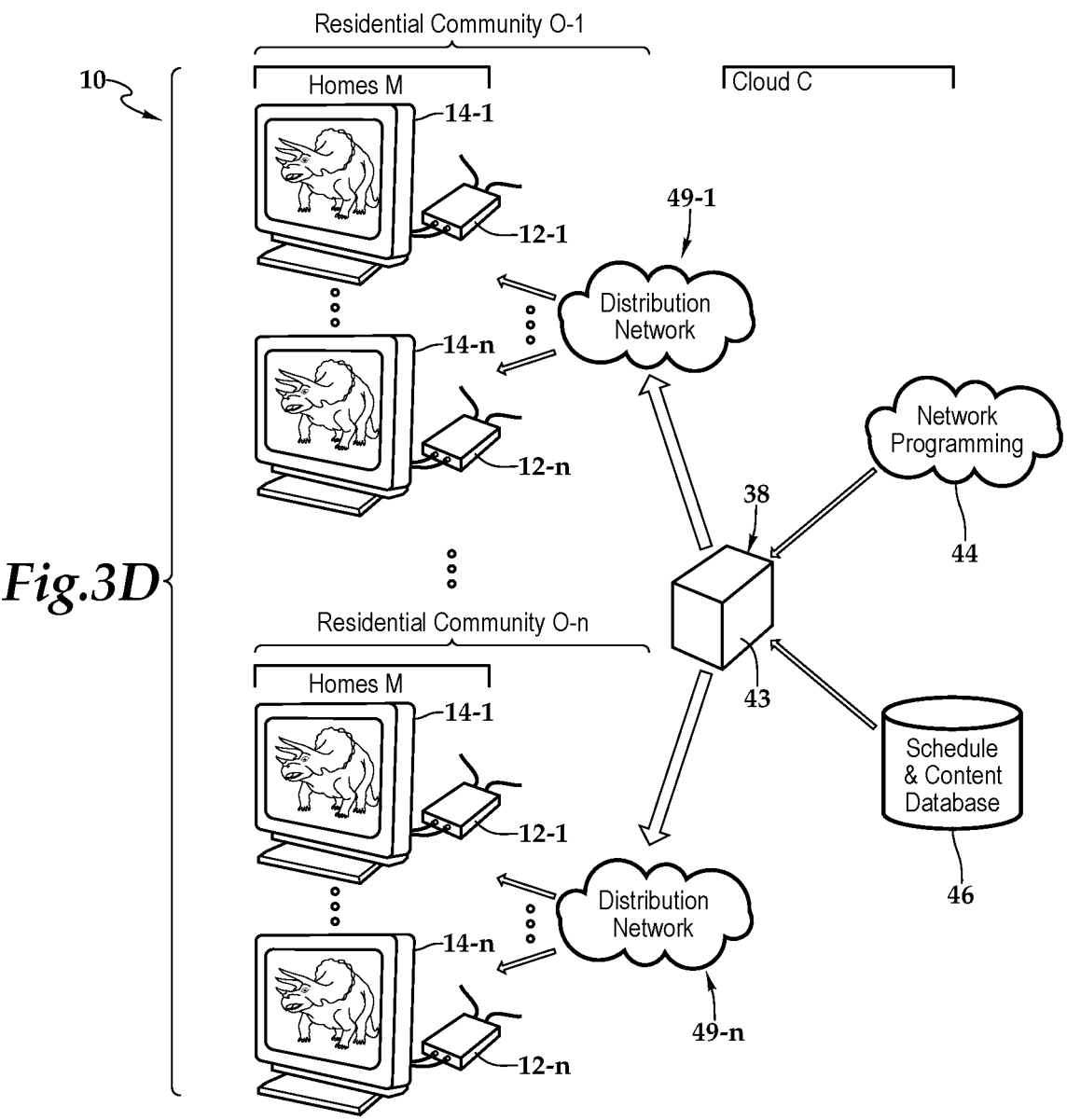

CONTENT MANAGEMENT SYSTEM AND METHOD FOR USE OF SAME

PRIORITY STATEMENT & CROSS-REFERENCE TO RELATED APPLICATIONS

This application is a continuation of U.S. application Ser. No. 17/153,467 entitled "Content Management System and Method for Use of Same" filed on Jan. 20, 2021 in the names of Vanessa Ogle et al., now U.S. Pat. No. 11,350,181 issued on May 31, 2022; which is a continuation of U.S. application Ser. No. 16/511,326 entitled "Content Management System and Method for Use of Same" filed on Jul. 15, 2019 in the names of Vanessa Ogle, et al., now U.S. Pat. No. 10,904,636 issued on Jan. 26, 2021; which claims priority from U.S. Patent Application No. 62/697,657, entitled "Content Management System and Method for Use of Same" and filed on Jul. 13, 2018, in the name of William C. Fang; all of which are hereby incorporated by reference, in entirety, for all purposes. U.S. application Ser. No. 16/511,326, now U.S. Pat. No. 10,904,636, is also a continuation-in-part of U.S. patent application Ser. No. 16/194,587, entitled "Set-Top Box with Enhanced Content and System and Method for Use of Same" and filed on Nov. 19, 2018, in the names of Ogle et al.; which claims priority from U.S. Patent Application No. 62/587,795, entitled "Set-Top Box with Enhanced Content and System and Method for Use of Same" and filed on Nov. 17, 2017, in the name of William C. Fang; all of which are hereby incorporated by reference, in entirety, for all purposes.

TECHNICAL FIELD OF THE INVENTION

This invention relates, in general, to content management and, in particular, to systems and methods for the operation, control, and oversight of content, such as advertising, for example, in environments such as hospitality environments and residential environments.

BACKGROUND OF THE INVENTION

Network programming on a television remains an effective advertising medium. To enhance effectiveness, advertisers seek to develop advertisements that target prospective consumers based on interests, behavior, demographics, or location, for example. A challenge that advertisers have with targeted advertising on traditional network programming on a television is being able to deliver targeted advertising to prospective consumers. Accordingly, there is a need for improved systems and methods for advertisers that enable the delivery to prospective consumers of targeted advertising during traditional network programming on a television.

SUMMARY OF THE INVENTION

It would be advantageous to achieve a set-top box that would improve upon existing limitations in functionality with respect to targeted advertising during traditional network programming on a television. It would also be desirable to enable a computer-based electronics and software solution that would provide enhanced content delivery to prospective consumers with targeted advertising. To better address one or more of these concerns, a set-top box with enhanced content and system and method for use of the same are disclosed. In one embodiment of the system, the set-top box is configured to receive a source signal which includes a stream of network programming having time slots interposed therein. The set-top box detects signaling data indicative of a designated time slot within the network programming and responsive thereto, interposes content stored at the set-top box at the designated time slot within the network programming. The set-top box then forwards the interposed content to the display. Following the forwarding of the interposed content, the set-top box returns to receiving network programming and forwarding the network programming to the display. The set-top box also provides confirmation of the displayed interposed content to a server, which may map the confirmation information. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 1 is a schematic diagram depicting one embodiment of a system for providing a set-top box having enhanced content therein according to the teachings presented herein;

FIG. 2 is a schematic diagram depicting one embodiment of the set-top box splicing enhanced content into a network program stream;

FIG. 3D is a schematic diagram depicting another embodiment of the system of FIG. 1 within a cloud-computing deployment serving multiple properties;

DETAILED DESCRIPTION OF THE INVENTION

Figure 3A:
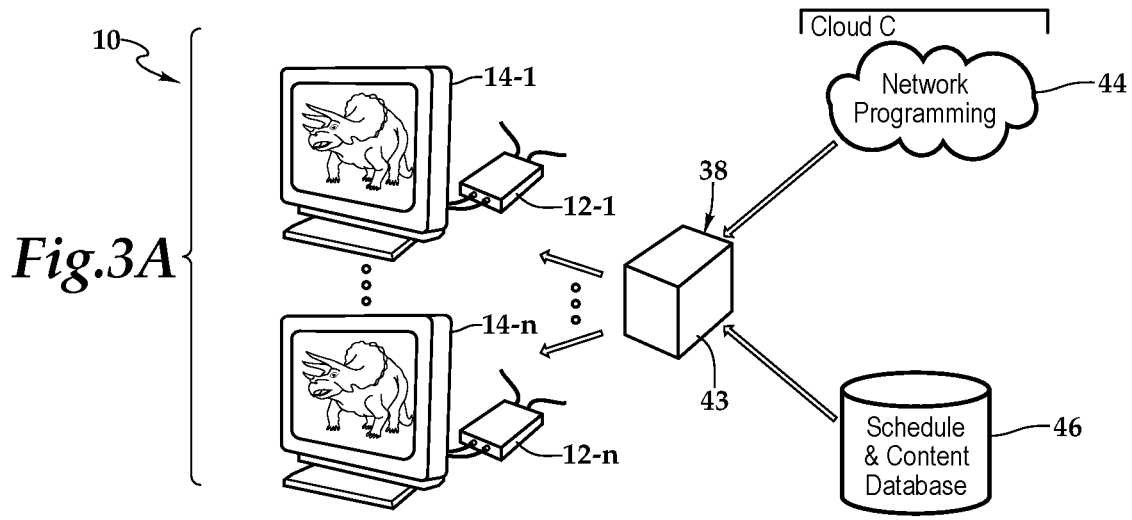
FIG. 3A is a schematic diagram depicting one embodiment of the system of FIG. 1 within a cloud-computing deployment.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Referring initially to FIG. 1, therein is depicted one embodiment of a system for providing enhanced content, which is schematically illustrated and designated 10. As shown, the system 10 includes a set-top box 12 and a display 14, which is illustrated as a television having a screen 16. It should be appreciated however, that the display 14 may also be any electronic visual display device, for example. The set-top box 12 includes a housing having a connection, which is depicted as an HDMI connection 20 that connects the set-top box 12 to the display 14. Other connections include a power cable 22 coupling the set-top box 12 to a power source, a coaxial cable 24 coupling the set-top box 12 to an external cable source, and a category five (Cat 5) cable 26 coupling the set-top box 12 to an external pay-per-view source at a hotel or other lodging establishment, for example. As shown, the set-top box 12 may include a dongle 28 providing particular technology and functionality extensions thereto. That is, the set-top box 12 may be a set-top box-dongle combination in one embodiment. It should be appreciated that the cabling connected to the set-top box 12 will depend on the environment and application and the cabling connections presented in FIG. 1 are depicted for illustrative purposes. Moreover, it should be appreciated that the positioning of the set-top box 12 will vary depending on environment and application and, with certain functionality, the set-top box 12 may be placed more discretely behind the display 14. By way of further example, the set-top box 12 may be an in-wall mount as opposed to the illustrated free standing information appliance device.

In one implementation, the set-top box 12 is configured to receive a source signal at the coaxial cable which includes a stream of network programming having time slots interposed therein. As illustrated, channel 403, as indicated by C1, is broadcasting a program, as indicated by P1, and this program P1 is on the screen 16 of the display 14. The set-top box 12 detects signaling data indicative of a designated time slot within the network programming and responsive thereto, interposes content stored at the set-top box 12 at the designated time slot within the network programming. The set-top box 12 then forwards the interposed content to the display 14 via the signal output. As illustrated, channel 403, as indicated by C1, is broadcasting the content, as indicated by P2, and this content P2 is on the screen 16 of the display 14. Following the forwarding of the interposed content P2, the set-top box 12 returns to receiving network programming on the signal input and forwarding the network programming to the display 14 via the signal output on the HDMI connection 20.

Referring now to FIG. 2, in one embodiment, the set-top box 12 is providing network programming 30 in an environment where scheduled content time slots, such as time slot 32, are planned for content 34, such as advertising content or promotional content, according to a schedule or schedules 36. The network programming 30 may be audio media or audiovisual media and is depicted as audiovisual media to fully leverage the display 14. As shown, the network programming 30 may include splice signaling data 37 indicating the available time slot by way of an opening 37-O and a closing 37-C. In one implementation, the set-top box 12 receives the schedule 36 from a server 38 indicating the time when the content 34 may be inserted into an available time slot 32. Based on the schedule 36, the set-top box 12 receives the content 34 and stores the received content 34 in a queue for insertion into the available time slot 32 within the network programming 30. In one implementation, the set-top box 12 actively fetches the content 34 based on the schedule 36 and in another implementation, the server 38 sends the content 34 to the set-top box 12. In another embodiment, the set-top box 12 may acquire the content 34 in real-time, when required for insertion into the network programming 30. The content 34 may be an advertisement or non-advertising content. In an embodiment relating to hospitality establishments, the content 34 may be non-advertising content related to a hospitality establishment such as a furnished multi-family residences, dormitories, lodging establishments, hotels, hospitals, and multi-unit environments. Further, the content 34 may be advertising content that is replacing advertising content within the network programming 30.

As mentioned, the network programming 30 includes splice signaling data 37 indicating the available time slot 32 by way of the opening 37-O and the closing 37-C. The splice signaling data 37 may be an audio indicator, such as a dual-tone multi-frequency signaling (DTMF), a visual indicator, or a digital indicator, for example. When the set-top box 12 detects the time slot 32 by way of the splice signaling data 37, the set-top box 12 inserts the content 34 into the stream forwarded to the display 14 and then returns to the network programming 30. It should be appreciated that the set-top box 12 audio and video decoding functions continue to decode the network programming stream and presenting video and audio to the display 14.

Set-top box data 40 includes confirmation of the display of the interposed content 34 by the set-top box 12 on the display 14. The set-top box data 40 is provided by the set-top box 12 to the server 38. The set-top box data 40 may include information such as the identity of the set-top box, the identity of the guest, the identity of the interposed content, the scheduling of the interposed content, and the viewing of the displayed interposed content, such as fully viewed, partially viewed, or not viewed. As illustrated, the server 38 may process, analyze, report, and depict, for example, the set-top box data 40. In one embodiment, a map view 42 of the hospitality establishment may be depicted and include a graphical representation of the rooms annotated with at least a portion of the set-top box data 40.

The server 38 may be remotely located to serve multiple set-top boxes and displays each located on different properties. It should also be appreciated that the server 38 may be located on a single property to serve one or more set-top boxes and displays thereon. Further, it should be appreciated that the server 38 may be remotely located to serve multiple properties having multiple televisions. Further, the server 38 may located to server a variety of residential properties, including, for example, single-family houses, duplexes, or townhomes, or to serve a variety of multi-unit properties, including, for example, multi-family residences, apartments, hospitals, and the like. Generally, the set-top boxes and systems presented herein may be utilized in any environment, which may be a single family residence such as a house, duplex, or townhome. Alternatively, the environment may be a hospitality lodging establishment or more generally, hospitality property, which may be a furnished multi-family residence, dormitory, lodging establishment, hotel, hospital, or other multi-unit environment.

Referring now to FIG. 3A, the system 10 may be deployed such that the server 38, which includes a housing 43, is remotely located in the cloud C to service disbursed set-top boxes 12-1 . . . 12-n and corresponding displays 14-1 . . . 14-n, with, in one embodiment, network programming content sources 44 configured to provide sources of network programming 30. The server 38 includes a signal output and other components therein. The server 38 has access to schedule and content databases 46, which store the particular content 34 and the schedule 36. It should be appreciated that the schedule and content databases may be partially or fully integrated into the server 38. As mentioned, the server 38 may process, analyze, report, and depict, for example, the set-top box data 40.

Figure 3B:
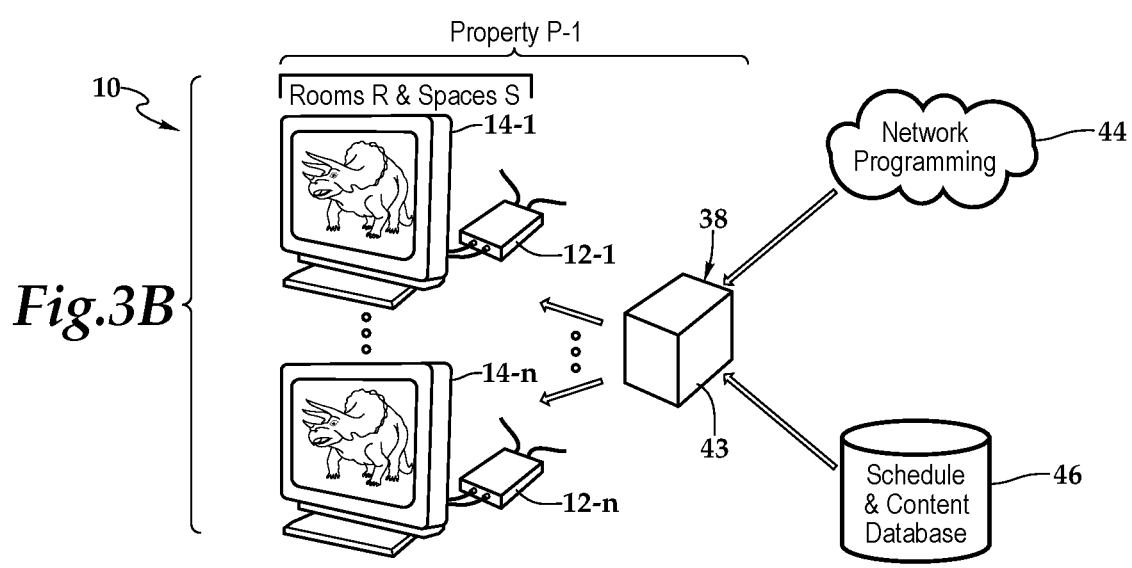
FIG. 3B is a schematic diagram depicting one embodiment of the system of FIG. 1 within an on-property deployment.

Referring now to FIG. 3B, the system 10 may be deployed such that the server 38, which includes the housing 43, is co-located on the property P-1 with the set-top boxes 12-1 . . . 12-n and the corresponding displays 14-1 . . . 14-n, with, in one embodiment, network programming content sources 44 configured to provide sources of network programming 30. The property P-1 may have various rooms R and spaces S where the set-top boxes 12-1 . . . 12-n and the corresponding displays 14-1 . . . 14-n are displayed. The server 38 has access to the schedule 36 and content databases 46, which store the particular content 34 and the schedule 36. As mentioned, the server 38 may process, analyze, report, and depict, for example, the set-top box data 40.

Figure 3C:
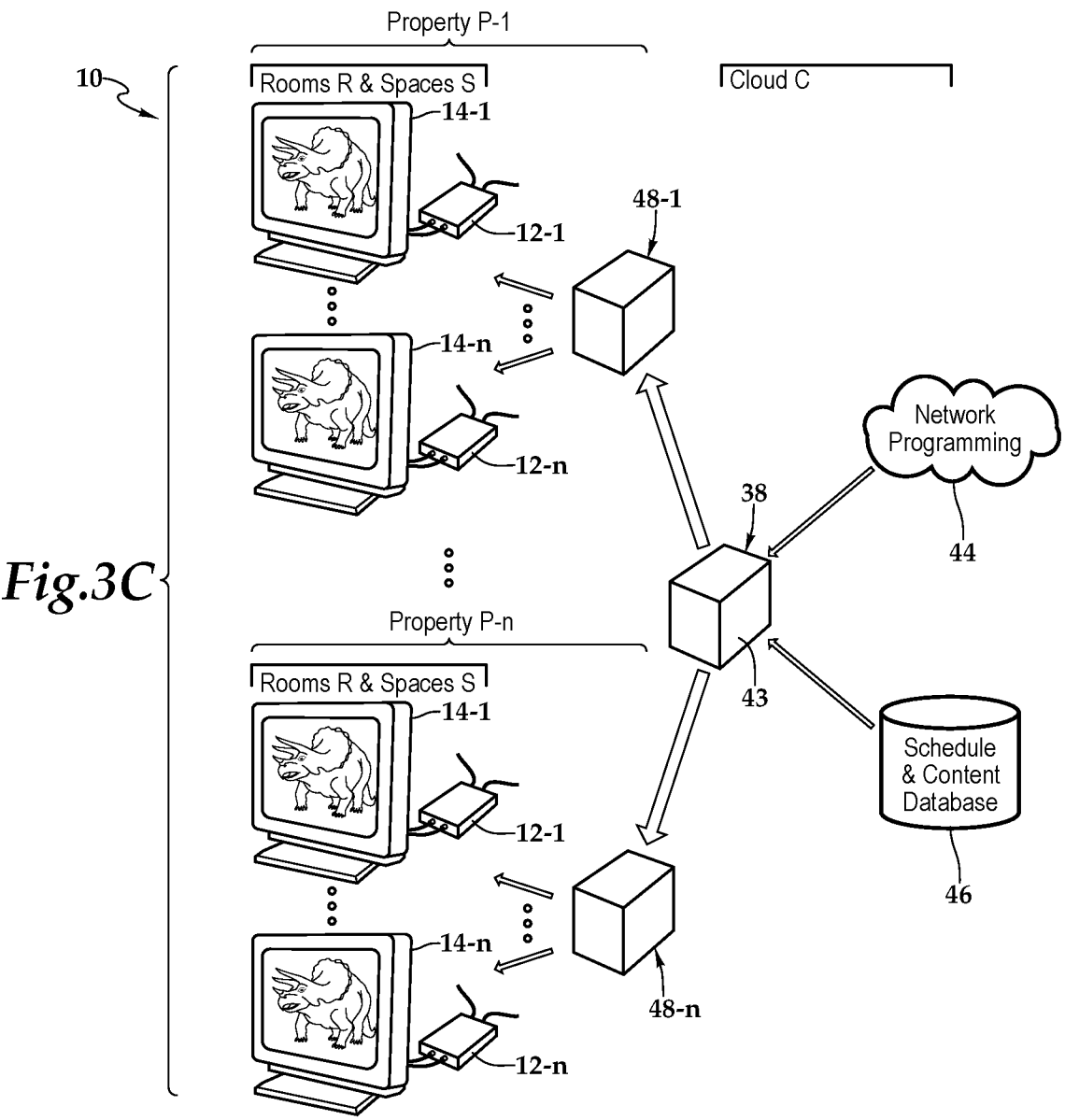
FIG. 3C is a schematic diagram depicting one embodiment of the system of FIG. 1 within a cloud-computing deployment serving multiple properties.
Figure 4A:
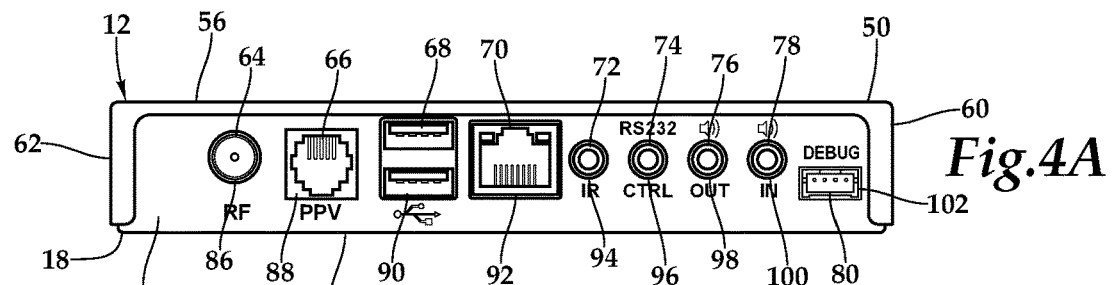
FIG. 4A is a wall-facing exterior elevation view of one embodiment of the set-top box depicted in FIG. 1 in further detail.
Figure 4B:
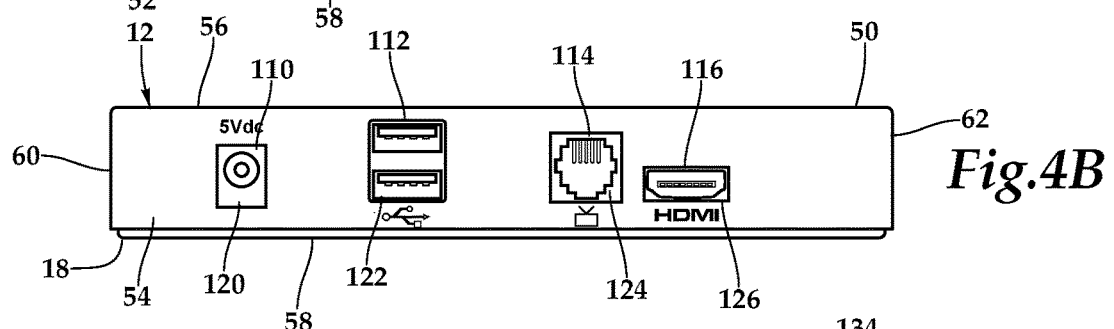
FIG. 4B is a television-facing exterior elevation view of the set-top box depicted in FIG. 1.
Figure 4C:
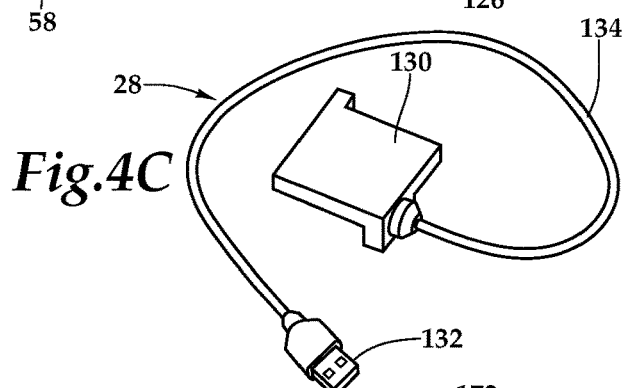
FIG. 4C is a front perspective view of a dongle depicted in FIG. 1 in further detail.
Figure 5:
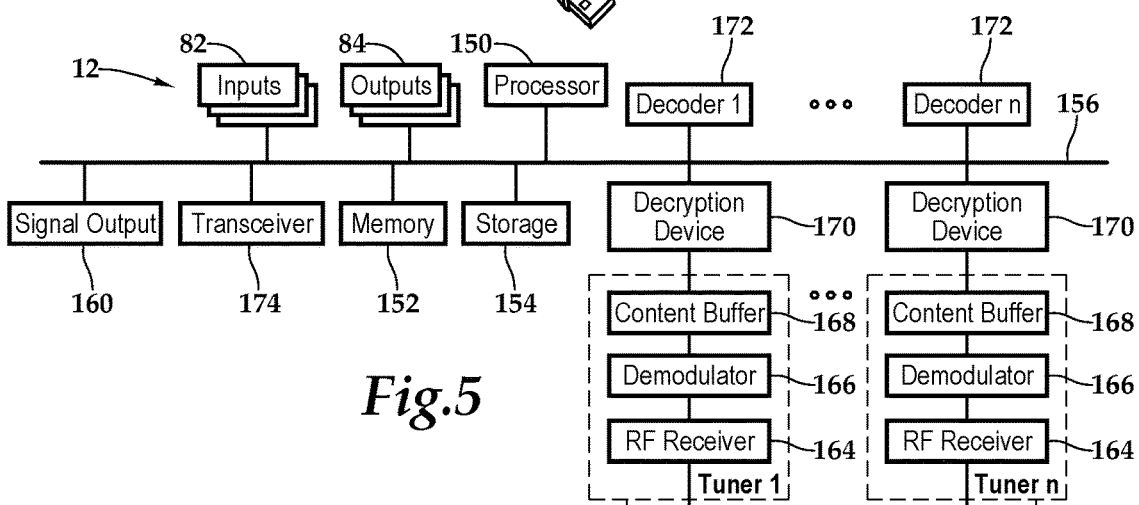
FIG. 5 is a functional block diagram depicting one embodiment of the set-top box presented in FIGS. 3A and 3B.

Referring to FIG. 3C, the system 10 may be deployed such that the server 38 is located remotely within cloud C relative to set-top boxes 12-1 . . . 12-n, which are located at properties P-1 through P-n. Each property P-1 . . . P-n has various rooms R and spaces S. In particular, the server 38, which receives content from network programming content sources 44, may be located remotely relative to the set-top boxes 12-1 . . . 12-n and displays 14-1 . . . 14-n such that a property headend 48-1 . . . 48-n is interposed between the server 38 and the set-top boxes 12-1 . . . 12-n. As shown, in this implementation, the property headend 48-1 . . . 48-n is co-located with the set-top boxes 12-1 . . . 12-n at a respective property, P-1 through P-n. As mentioned, the server 38 may process, analyze, report, and depict, for example, the set-top box data 40.

Referring to FIG. 3D, the system 10 may be deployed such that the server 38 is located remotely within cloud C relative to set-top boxes 12-1 . . . 12-n, which are located at residential communities O-1 through O-n. Each residential community O-1 . . . O-n has various homes M. In particular, the server 38, which receives content from network programming content sources 44, may be located remotely relative to the set-top boxes 12-1 . . . 12-n and displays 14-1 . . . 14-n such that a distribution network 49-1 . . . 49-n is interposed between the server 38 and the set-top boxes 12-1 . . . 12-n. As shown, in this implementation, the distribution networks 49-1 . . . 49-n may service various residential communities, which, in turn are servicing residences such as single family homes or multi-family homes or other living arrangements. As mentioned, the server 38 may process, analyze, report, and depict, for example, the set-top box data 40.

More and more streaming services are able to target advertisements directly to the subscriber. Network programming providers, however, have not been able to target advertisements directly to the subscriber or viewer due to the fact that all the television programs are delivered in the broadcasting methodology. Therefore, all the subscribers are receiving the same program and advertisements. Cable companies, for example, have advertising insertion equipment installed at various sub-stations, or sub-headends. The granularity of the subscriber is limited to a community or a city with this cable company methodology. The teachings presented herein provide greater granularity via the set-top box to the hotel environment or residential subscriber, for example, by providing, in one aspect, in-room advertising insertion technology.

As described herein, in some embodiments, the content and advertising delivery infrastructure from the server to the set-top boxes provides the set-top boxes with content and advertising insertion capability. As will be continued to be described hereinbelow, in addition to receiving the network programming signal and decoding the network programming signal, the set-top boxes are capable of receiving the content and advertising material as well as the necessary schedule, queue the content in local storage, and insert the content according to the schedule received by the server, which may be provided by a content management and publishing engine or the like. In some implementations, the network programming signal programming provides the splice signaling data or other slotting information that is leveraged by the set-top box for the granular content and advertising insertion.

Referring to FIG. 4A, FIG. 4B, FIG. 4C, and FIG. 5, as used herein, set-top boxes, back boxes and set-top/back boxes may be discussed as set-top boxes. By way of example, the set-top box 12 may be a set-top unit that is an information appliance device that generally contains set-top box functionality including having a television-tuner input and displays output through a connection to a display or television set and an external source of signal, turning by way of tuning the source signal into content in a form that can then be displayed on the television screen or other display device. The information appliance device may include high speed internet access point capabilities. Such set-top boxes are used in cable television, satellite television, and over-the-air television systems, for example.

The set-top box 12 includes a housing 18 with a cover 50 and a rear wall 52, front wall 54, top wall 56, bottom base 58, and two sidewalls 60, 62. It should be appreciated that front wall, rear wall, and side wall are relative terms used for descriptive purposes and the orientation and the nomenclature of the walls may vary depending on application. The front wall includes various ports, ports 64, 66, 68, 70, 72, 74, 76, 78, and 80 that provide interfaces for various interfaces, including inputs and outputs. In one implementation, as illustrated, the ports 64 through 80 include inputs 82 and outputs 84 and, more particularly, an RF input 86, a RJ-45 input 88, universal serial bus (USB) input/outputs 90, an Ethernet category 5 (Cat 5) coupling 92, an internal reset 94, an RS232 control 96, an audio out 98, an audio in 100, and a debug/maintenance port 102. The front wall 54 also includes various inputs 82 and outputs 84. More particularly, ports 110, 112, 114, and 116 include a 5V dc power connection 120, USB inputs/outputs 122, an RJ-45 coupling 124, and an HDMI port 126. It should be appreciated that the configuration of ports may vary with the set-top box 12 depending on application and context. As previously alluded to, the housing 18 may include a housing-dongle combination including, with respect to the dongle 28, a unit 130 having a cable 134 with a set-top box connector 132 for selectively coupling with the set-top box 12.

Within the housing 18, a processor 150, memory 152, storage 154, the inputs 82, and the outputs 84 are interconnected by a bus architecture 156 within a mounting architecture. It should be understood that the processor 150, memory 152, storage 154, the inputs 82, and the outputs 84 may be entirely contained within the housing 18 or the housing-dongle combination. The processor 150 may process instructions for execution within the computing device, including instructions stored in the memory 152 or in storage 154. The memory 152 stores information within the computing device. In one implementation, the memory 152 is a volatile memory unit or units. In another implementation, the memory 152 is a non-volatile memory unit or units. Storage 154 provides capacity that is capable of providing mass storage for the set-top box 12. Various inputs 82 and outputs 84 provide connections to and from the computing device, wherein the inputs 82 are the signals or data received by the set-top box 12, and the outputs 84 are the signals or data sent from the set-top box 12.

A signal input 158 and a signal output 160 are also secured in the housing 18 in order to receive content from a source, such as a hospitality property, and forward the content, including external content such as cable and satellite and pay-per-view (PPV) programing and the content 34 to the display. More specifically, the signal input 158 receives a source signal from an external source. The source signal includes multiple channels. Each tuner 162 is configured to receive and tune a channel from the source signal as well as, in one embodiment, process the received content for insertion. As shown, each tuner 162 includes an RF receiver 164, a demodulator 166, and a content buffer 168 associated with a decryption device 170 and a decoder 172 in order to provide a tuned channel. The radio frequency (RF) receiver 164 is the portion of the tuner that receives RF transmissions and converts the selected carrier frequency and its associated bandwidth into a fixed frequency that is suitable for further processing. The demodulator 166 is an electronic circuit that is used to recover the information content from the modulated carrier wave provided by the RF receiver 164. The content buffer 168 stores the signal and may be independent storage or associated with or form a portion of the memory 152 or the storage 154. The decryption device 170 then decrypts the demodulated signal before decoding at the decoder 172. It should be appreciated that although a particular architecture of tuner, RF receiver, demodulator, decryption device and decoder is depicted, other architectures are within the teachings presented herein.

A transceiver 174 is associated with the set-top box 12 and communicatively disposed with the bus architecture 156. As shown the transceiver 174 may be internal, external, or a combination thereof to the housing. Further, the transceiver 174 may be a transmitter/receiver, receiver, or an antenna for example. Communication between various amenities in a room with the set-top box 12 and the set-top box 12 may be enabled by a variety of wireless methodologies employed by the transceiver 174, including 802.11, 802.11 a/b/g/n/ac, 3G, 4G, Edge, WiFi, ZigBee, near field communications (NFC), Bluetooth low energy and Bluetooth, for example. Also, infrared (IR) may be utilized.

The memory 152 and storage 154 are accessible to the processor 150 and include processor-executable instructions that, when executed, cause the processor 150 to execute a series of operations. The processor-executable instructions cause the processor 150 to receive the schedule 36 from the server 38. As previously discussed, the schedule 36 may include a listing of the time slots 32. The processor-executable instructions then cause the processor 150 to store the schedule 36 at the set-top box 12. According to the schedule 36, the processor 150 is caused to receive content 34 relative to the designated time slot 32 from the server 38 and store the content 34 at the set-top box 12. The processor-executable instructions may cause the processor 150 to receive the content 34 in advance or dynamically and substantially in real time. The processor-executable instructions then cause the processor 150 to receive network programming 30 on the signal input 158 and forward the network programming to the display 14 via the signal output 160. By way of the processor-executable instructions, the processor 150 may detect signaling data indicative of the designated time slot 32 within the network programming 30, and interpose, by way of splicing, for example, the content 34 at the designated time slot 32 within the network programming 30 and forward the interposed content to the display 14 via the signal output 160. Following the forwarding of the interposed content, the set-top box 12 returns to receiving network programming on the signal input 158 and forwarding the network programming to the display 14 via the signal output 160. The processor-executable instructions also cause the processor 150 to send set-top box data 40 to the server 38. The set-top box data 40 may include information such as the identity of the set-top box, the identity of the guest, the identity of the interposed content, the scheduling of the interposed content, and the viewing of the displayed interposed content, such as fully viewed, partially viewed, or not viewed.

Figure 6:
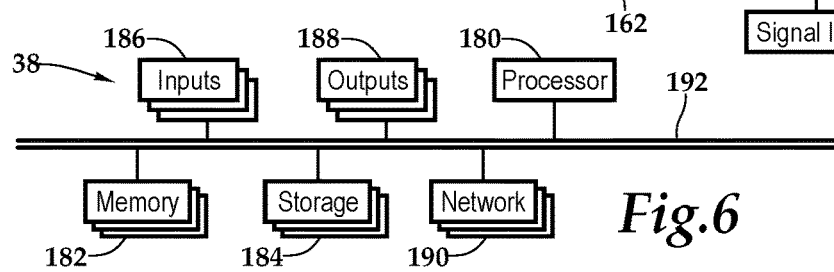
FIG. 6 is a functional block diagram depicting one embodiment of a server presented in FIGS. 2A and 2B.

Referring now to FIG. 6, one embodiment of the server 38 as a computing device includes a processor 180, memory 182, storage 184, inputs 186, outputs 188, and network interface 190 interconnected with various buses 192 in a common or distributed, for example, mounting architecture. In other implementations, in the computing device, multiple processors and/or multiple buses may be used, as appropriate, along with multiple memories and types of memory. Further still, in other implementations, multiple computing devices may be provided and operations distributed therebetween. The processor 180 may process instructions for execution within the server 38, including instructions stored in the memory 182 or in storage 184. The memory 182 stores information within the computing device. In one implementation, the memory 182 is a volatile memory unit or units. In another implementation, the memory 182 is a non-volatile memory unit or units. Storage 184 includes capacity that is capable of providing mass storage for the server 38. Various inputs 186 and outputs 188 provide connections to and from the server 38, wherein the inputs 186 are the signals or data received by the server 38, and the outputs 188 are the signals or data sent from the server 38. The network interface 190 provides the necessary device controller to connect the server 38 to one or more networks.

The memory 182 is accessible to the processor 180 and includes processor-executable instructions that, when executed, cause the processor 180 to execute a series of operations. The processor-executable instructions cause the processor 180 to update periodically or on-demand, depending on the operational configuration, a database which may be part of storage 184 of schedules of time slots on various channels of network programming and related content or update portion thereof, with current timeslot scheduling and content information. The processor-executable instructions cause the processor 180 to make this database or a portion thereof available to the set-top boxes 12 by way of the set-top boxes 12 receiving the information through fetching or the server 38 sending the requested information. Thus, the systems and methods disclosed herein enable set-top boxes to have enhanced content offerings. Further, the systems and methods disclosed herein may enable advertisers to use set-top boxes as a solution to provide to prospective consumers targeted advertising, during network programming, for example, and confirmation of the viewing of the interposed content.

More particularly, the processor-executable instructions cause the server 38 to receive the set-top box data 40 from the various set-top boxes 12. As mentioned, the set-top box data 40 may include information such as the identity of the set-top box, the identity of the guest, the identity of the interposed content, the scheduling of the interposed content, and the viewing of the displayed interposed content, such as fully viewed, partially viewed, or not viewed. In one embodiment, the processor-executable instructions cause the processor 180 to render a map view of the hospitality establishment based on obtained map data. The map view 42 may include a graphical representation of the room and a plurality of other room rooms at the hospitality establishment. The processor-executable instructions may also cause the processor 180 to annotate the graphical representation of the room with at least a portion of the set-top box data 40. More generally, the processor-executable instructions may also cause the processor 180 to process, analyze, report, and depict, for example, the set-top box data 40 in various ways.

Figure 7:
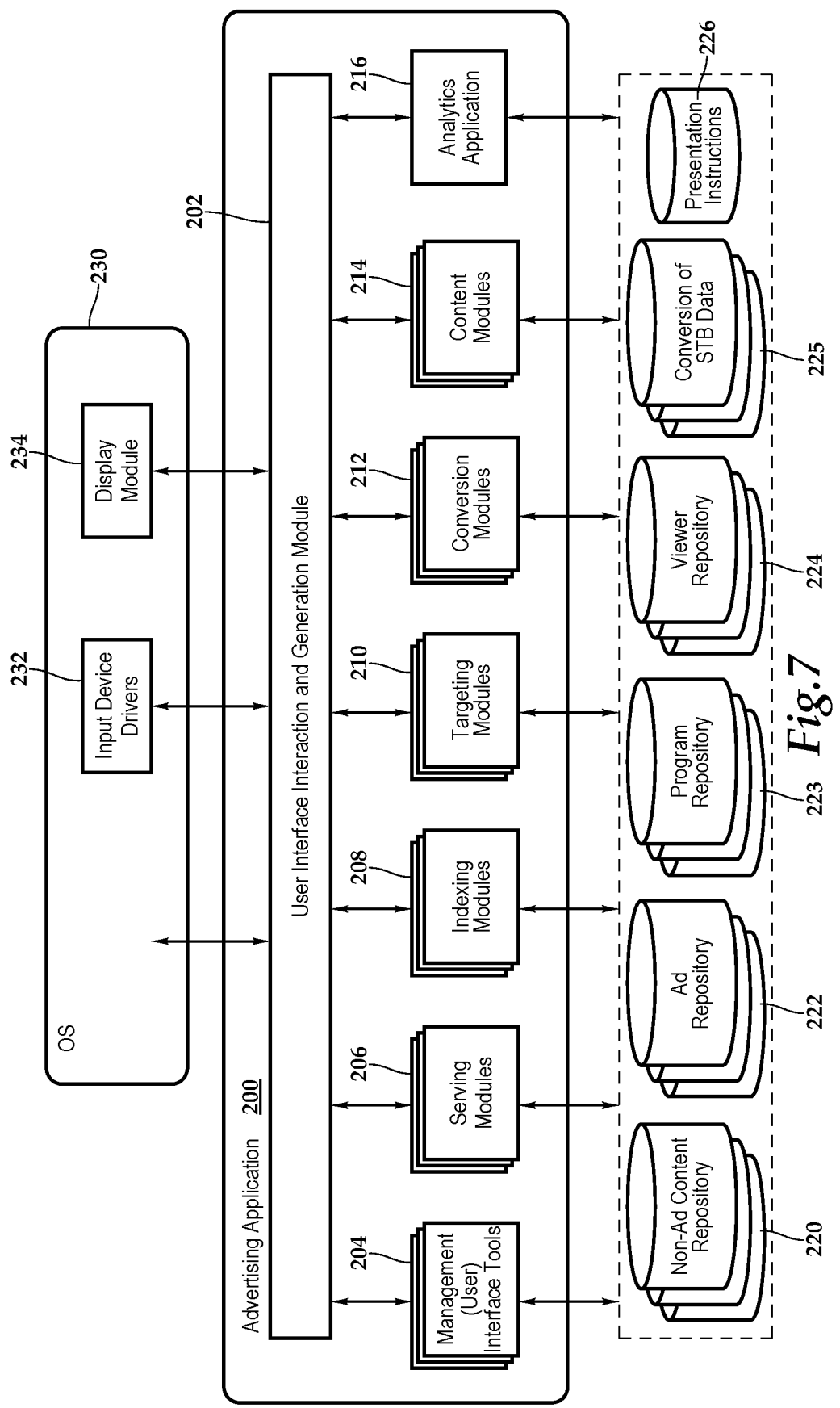
FIG. 7 is a conceptual module diagram depicting a software architecture of an analytics application of some embodiments.

FIG. 7 conceptually illustrates the software architecture of an advertising application 200 of some embodiments that may select the content for insertion into the programming. In some embodiments, the advertising application 200 is a stand-alone application or is integrated into another application, while in other embodiments the application might be implemented within an operating system 230. Furthermore, in some embodiments, the advertising application 200 is provided as part of a server-based solution or a cloud-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The advertising application 200 includes a user interface (UI) interaction and generation module 202, management (user) interface tools 204, serving modules 206, indexing modules 208, targeting modules 210, conversion modules 212, content modules 214, and an analytics application 216. The advertising application 200 has access to non-ad content repositories 220, ad repositories 222, program repositories 223, viewer repositories 224, conversion of STB databases 225, and presentation instructions 226, which provide the data to the management (user) interface tools 204 for the utilization of the storages 220, 222, 223, 224, 225, 226. In some embodiments, storages 220, 222, 223, 224, 225, 226 are all stored in one physical storage. In other embodiments, the storages 220, 222, 223, 224, 225 226 are in separate physical storages, or one of the storages is in one physical storage while the other is in a different physical storage.

The UI interaction and generation module 202 generates a user interface that allows the end user to specify parameters that may be utilized to generate content for insertion into programming. Prior to the generation of the content, the serving modules 206 may identify relative content from the non-ad content repository 220 and ad repository 222 based on information received from the indexing modules 208 and the targeting modules 210, which may include algorithms designed to match advertising with the viewer's network programming based on viewer profiles and preferences. In one implementation, the serving modules may include an advertising content management and publishing engine that manage the content assigned by algorithms and specifically send the content to the targeted set-top box and viewer with a very specific insertion schedule and time. The indexing modules 208 generate an index based on various statistical processes and/or modeling for identifying content based on the planned programming in the program repository 223. Similarly, the targeting modules generate factors based on various statistical processes and/or modeling for identifying content based on the planned guest viewers in the viewer repository 224. The viewer repository 224 includes known information and data about the viewer or viewers of the particular set-top box, such as network programming choices, customer preferences, including goods and services purchased as well as details about subscription services. In an embodiment where the technology is deployed in a hospitality environment, a customer loyalty program may be included in the viewer repository as well as details such as personal preferences like linens, pillows, beds, beverages, foods, fitness, and network programming choices. The conversion modules 212 track the viewership (e.g., fully viewed, partially viewed, not viewed) of the content based on the received set-top box data stored in the conversion of set-top box data repository 225. The content modules 214 furnish the content for insertion to the set-top boxes and various other network components. The analytics application 216 may be executed to call an analytics application 250 of FIG. 8, for example.

In the illustrated embodiment, FIG. 7 also includes an operating system 230 that includes input device driver(s) 232 and a display module 234. In some embodiments, as illustrated, the input device drivers 232 and display module 234 are part of the operating system 230 even when the advertising application 200 is an application separate from the operating system 230. The input device drivers 232 may include drivers for translating signals from a keyboard, mouse, touchpad, tablet, touch screen, gyroscope or accelerometer, for example. A user interacts with one or more of these input devices, which send signals to their corresponding device driver. The device driver then translates the signals into user input data that is provided to the UI interaction and generation module 202.

Figure 8:
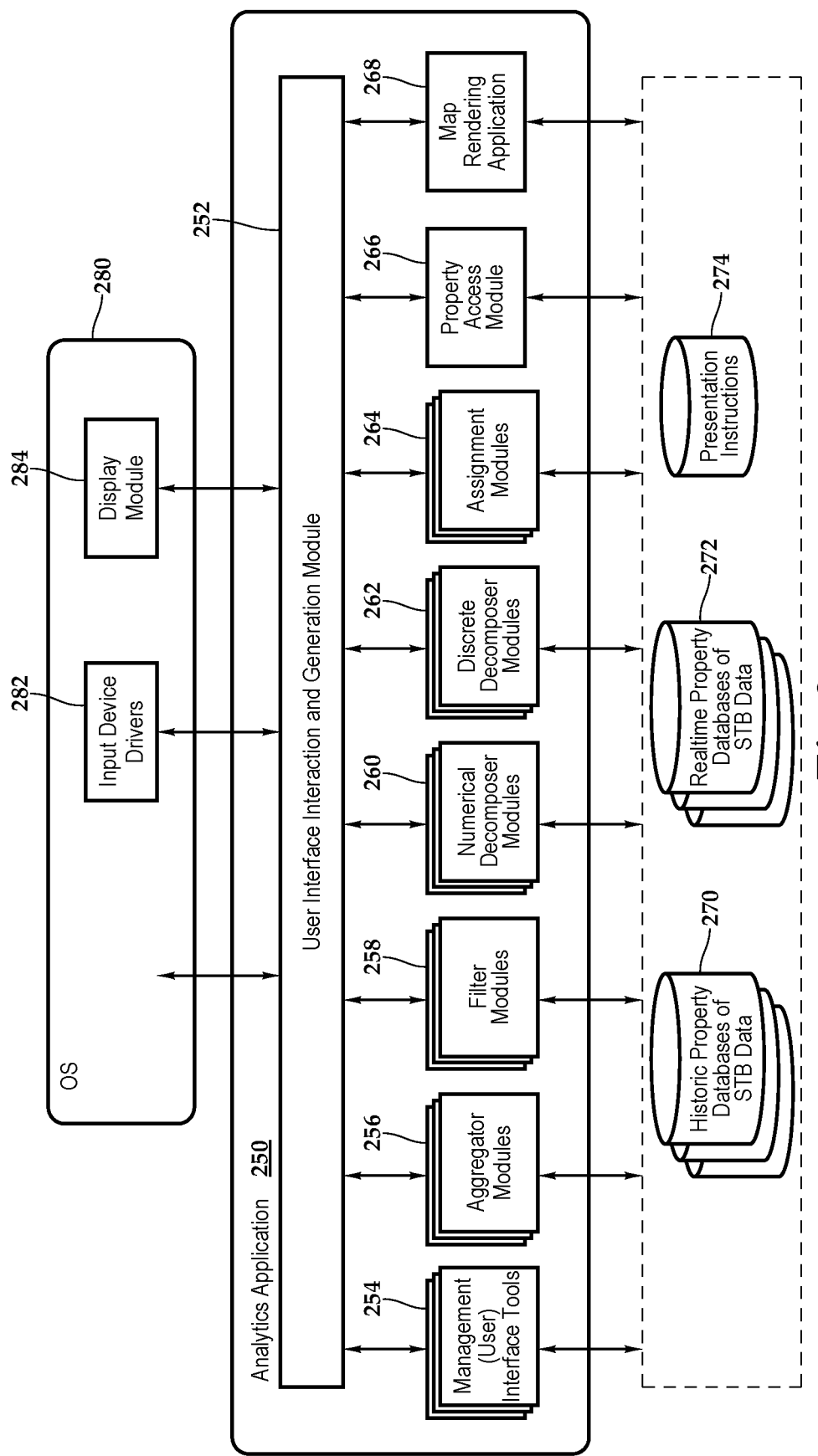
FIG. 8 is a conceptual module diagram depicting a software architecture of an analytics application of some embodiments.

FIG. 8 conceptually illustrates the software architecture of the analytics application 250 of some embodiments that may render the map view 42 of the hospitality establishment. In some embodiments, the analytics application 250 is a stand-alone application or is integrated into another application, while in other embodiments the application might be implemented within an operating system 280. Furthermore, in some embodiments, the analytics application 250 is provided as part of a server-based solution or a cloud-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The analytics application 250 includes a user interface (UI) interaction and generation module 252, management (user) interface tools 254, aggregator modules 256, filter modules 258, numerical decomposer modules 260, discrete decomposer modules 262, assignment modules 264, property access module 266, and a map rendering application 268. The analytics application 250 has access to historic property databases of set-top box data 270, real-time property databases of set-top box data 272, and presentation instructions 274, which presents instructions from the operation of the analytics operation 250. In some embodiments, storages 270, 272, and 274 are all stored in one physical storage. In other embodiments, the storages 270, 272, 274 are in separate physical storages, or one of the storages is in one physical storage while the other is in a different physical storage.

The UI interaction and generation module 252 generates a user interface that allows the end user to specify parameters that may be utilized to generate an annotated map view of the hospitality establishment, which may include elements of a heat map. Prior to the generation of an annotated map view of the hospitality establishment, the aggregator modules 256 may be executed to obtain instances of set-top box data. In other instances, the set-top box data is continually provided to the analytics application 250 such that the aggregator modules 256 do not have to obtain instances of set-top box data proactively. The set-top box data may also be filtered by the filter modules 258. The aggregator modules 256 and the filter modules 258 cooperate, in combination, to gather the desired set-top box data.

At this time, the parameters have been established for the annotated map view of the hospitality establishment by default or by an end user utilizing the management (user) interface tools 254. The numerical decomposer modules 260 may be executed to numerically decompose instances or summaries of set-top box data gathered by the aggregator modules 256 and the filter modules 258 by applying the selected performance characteristic or selected performance characteristics to the instances of the set-top box data. The discrete decomposer modules 262 may be executed to containerize the decomposed set-top box data. In this manner, multiple containers may be defined that each have a range of values. The assignment modules 264 may be executed to assign a pre-map annotation element to each of the multiple containers. The property access module 266 may be executed to obtain data from the historic property databases of set-top box data 270 or the real-time property databases of set-top box data 272. The map rendering application 268 may be executed to call a map rendering application 300 of FIG. 9, for example.

In the illustrated embodiment, FIG. 8 also includes an operating system 280 that includes input device driver(s) 282 and a display module 284. In some embodiments, as illustrated, the input device drivers 282 and display module 284 are part of the operating system 280 even when the analytics application 250 is an application separate from the operating system 280. The input device drivers 282 may include drivers for translating signals from a keyboard, mouse, touchpad, tablet, touch screen, gyroscope or accelerometer, for example. A user interacts with one or more of these input devices 282, which send signals to their corresponding device driver. The device driver then translates the signals into user input data that is provided to the UI interaction and generation module 252.

Figure 9:
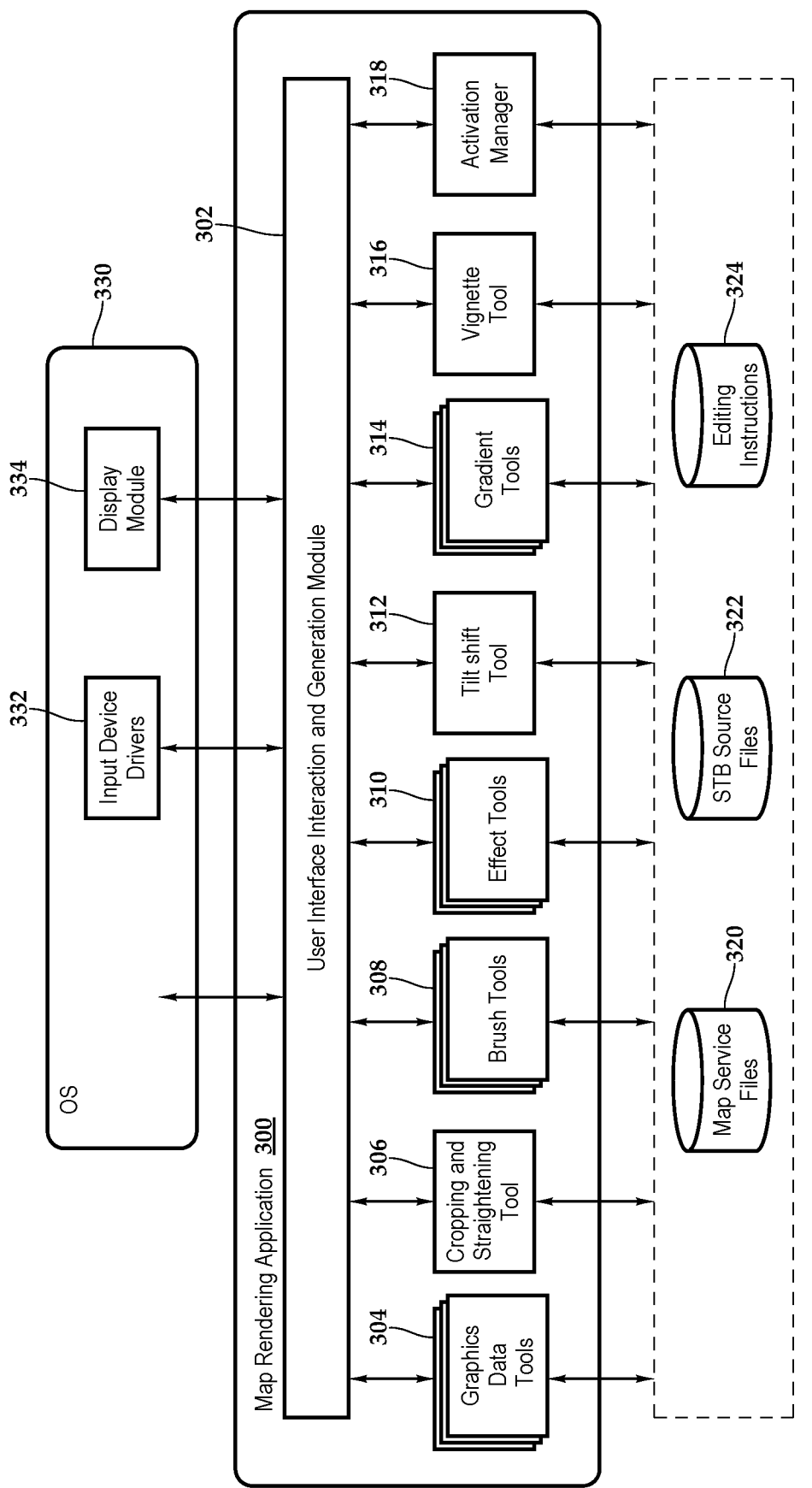
FIG. 9 is a conceptual module diagram depicting a software architecture of an image viewing, editing, and organization application of some embodiments.

FIG. 9 conceptually illustrates the software architecture of a map rendering application 300 of some embodiments that may render the map view 42 of the hospitality establishment. In some embodiments, the map rendering application 300 is a stand-alone application or is integrated into another application, while in other embodiments the application might be implemented within an operating system. Furthermore, in some embodiments, the map rendering application 300 is provided as part of a server-based solution or a cloud-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The map rendering application 300 includes a UI interaction and generation module 302, graphics data tools 304, a cropping and straightening tool 306, brush tools 308, effect tools 310, a tilt shift tool 312, gradient tools 314, a vignette tool 316, and an activation manager 318. The image editing application has access to map service files 320, set-top box source files 322, and editing instructions 324. In some embodiments, the map service files 320 may be vector graphics data files with texture identifiers or two or three dimensional map image files specified in one or more map tiles that may be raster-based map tiles, for example. The map service files 320 create a virtual model of the physical body of the hospitality establishment based on definitions derived from any GIS resources, such as a geodatabase, address location map document or geoprocess model, or any two- or three-dimensional CAD-based drawings and plans.

The set-top box source files 322 store operational instructions for processing set-top box data. The editing instructions 324 store the image editing operations that the map rendering application 300 performs as a set of instructions. The map rendering application 300 uses these set of instructions to generate new images based on the original data stored in the source files. In some embodiments, the map image files and/or media content data are stored as .mov, .avi, .jpg, .png, .gif, pdf, .mp3, .bmp, .wav, .txt, .tiff, etc. files in the map service files 320 and set-top box source files 322. In some embodiments, storages 320, 322, and 324 are all stored in one physical storage. In other embodiments, the storages 320, 322, 324 are in separate physical storages, or one of the storages is in one physical storage while the other is in a different physical storage.

In the illustrated embodiment, FIG. 9 also includes an operating system 330 that includes input device driver(s) 332 and a display module 334. In some embodiments, as illustrated, the input device drivers 332 and display module 334 are part of the operating system 330 even when the image editing application is an application separate from the operating system. The input device drivers 332 may include drivers for translating signals from a keyboard, mouse, touchpad, tablet, touch screen, gyroscope, accelerometer, etc. A user interacts with one or more of these input devices, which send signals to their corresponding device driver. The device driver then translates the signals into user input data that is provided to the UI interaction and generation module 300.

The present application describes a graphical user interface that provides users with numerous ways to perform different sets of operations and functionalities. By either executing a pre-determined series of editing instructions on a pre-determined set of media source files or receiving a selection of media processing operations, the present map rendering application 300 provides for a map view of the hospitality establishment with the appropriate annotations of set-top box data.

Figure 10A:
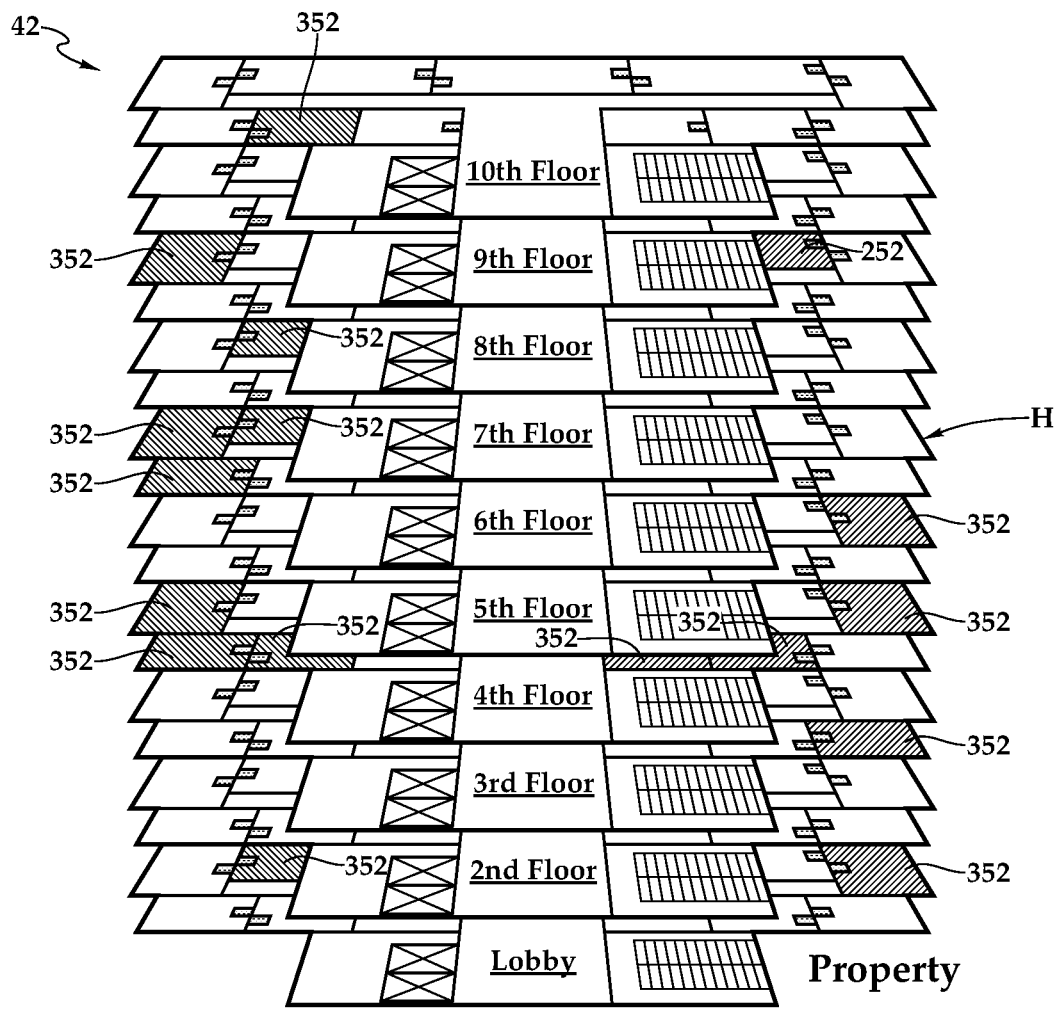
FIG. 10A is a schematic diagram depicting one embodiment of a map representation of a hospitality lodging establishment utilizing one embodiment of a hospitality property management tool presented herein.
Figure 10B:
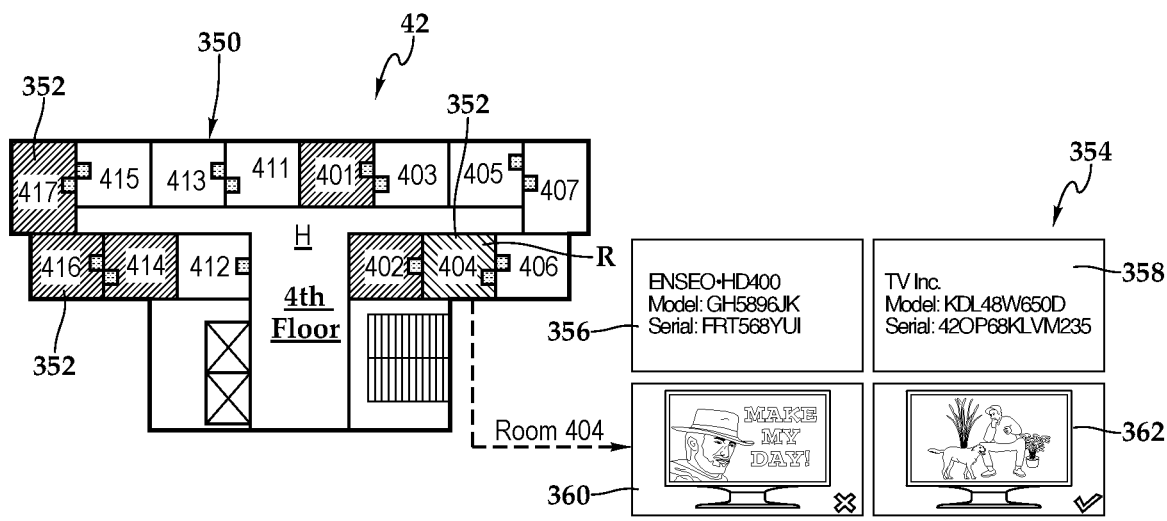
FIG. 10B is a schematic diagram depicting one embodiment of a map representation of a floor of the hospitality lodging establishment presented in FIG. 10A.

Referring now to FIG. 10A and FIG. 10B, in one implementation, property monitoring and optimization is provided in the form of a database, or as shown, in the map view 42 of the hospitality establishment H including a graphical presentation 350 of a floor of the hospitality establishment H, wherein particular hotel rooms with set-top box data historically and in substantially real time permits a user or manager to select the desired information and make optimal content and advertising decisions. As previously mentioned, it should be appreciated that although a hospitality establishment is depicted, the teachings presented herein are applicable to residential environments as well.

In particular, color-coding and hue assignment adds additional understanding and visibility into housekeeping and maintenance conditions as well as use. By way of example and not by way of limitation, the hospitality establishment H is graphically depicted as having a lobby and ten floors, which are lobby, $2^{nd}$ floor, 3rd floor, etc. For each floor, such as the $4^{th}$ floor, a floor layout is shown with rooms, such as rooms 401 through 407 and 411 through 417. In FIGS. 10A and 10B, by collecting the substantially real time and historic set-top box data from the field, a map may be shown depicting all rooms with television ON, for example. In particular, room 404 is highlighted to inspect the interposed content in terms of viewership.

As shown, by way of example, the status of television viewing of Room 404 is being examined as each highlighted room 352 has television ON. As shown, the graphical representation of Room 404 is annotated with information group 354. For example, information 356 is based on identification data that details the model and serial number of the set-top box 12 associated with the Room 404. Also, included in the annotation is information 358, which provides details on the physical connection with the display 14 associated with the set-top box of Room 404. Information 360 shows details on a particular recently viewed channel and commercial advertising content where viewership was not completed. Information 362 annotates the map view 42 with a commercial advertising content on the channel that is being viewed in full by the guest, based on the set-top box data 40 received from the set-top box 12 at the server 38. That is, in some embodiments, once the set-top box data 40 is captured, the set-top box 12 is directly uploaded to the server 38 and a database and then associated with the rooms shown on the map view 42. Management uses the map view 42 to gather real time information about the status of the rooms and properties and reports on content, such as advertising, viewership. To view the set-top box data 40 captured from each set-top box 12 in each room, the map view users can select a room from the map and appropriately click or tap on the rooms and then select the set-top box data 40 or other processing operations requested.

The system presented herein provides for the management of hospitality real estate and to the operation, control, and oversight of hospitality properties, such as lodging establishments, motels, or hotels, for example. In one embodiment, a web-hosted, cloud-based property monitoring and troubleshooting tool is furnished that provides a graphical presentation of the hospitality properties with historic and real time room and equipment status. As mentioned, historic set-top box data may be viewed by property or properties, room or room, with user selectable constraints such as data and time.

Figure 11A:
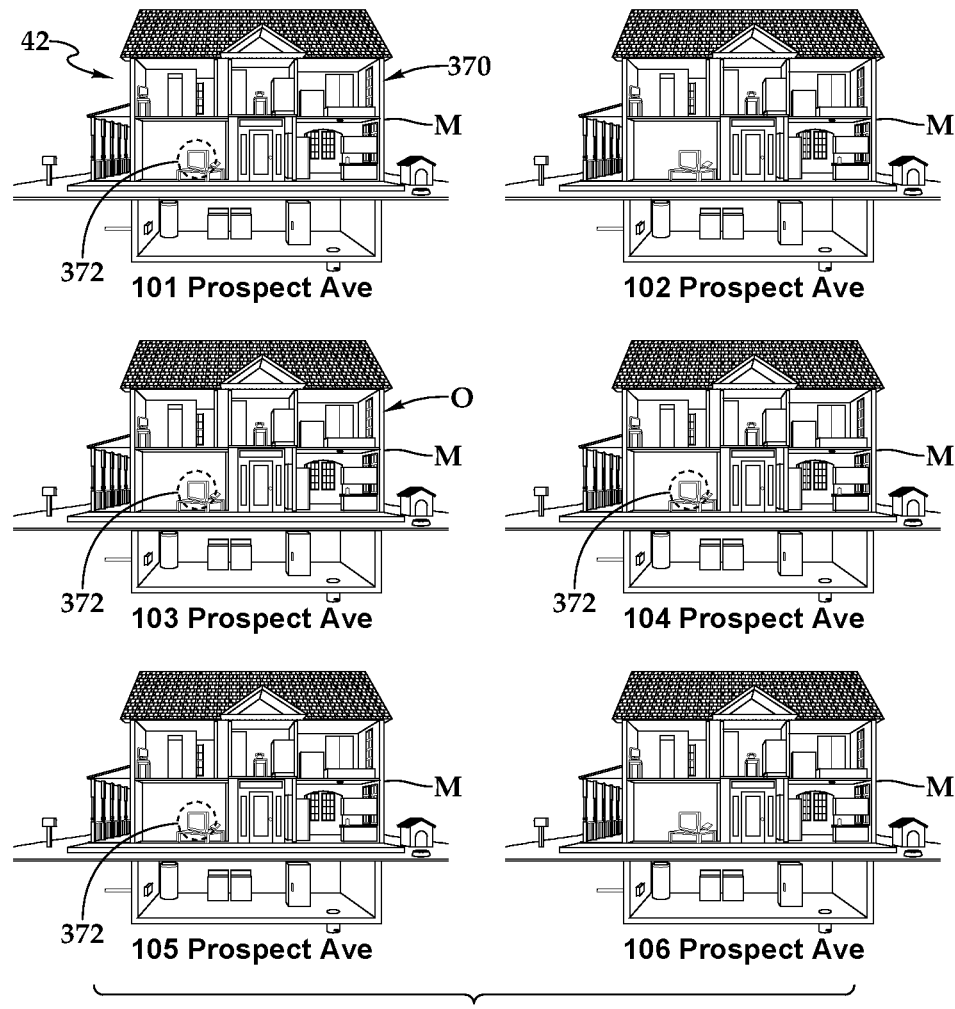
FIG. 11A is a schematic diagram depicting one embodiment of a map representation of residential communities utilizing one embodiment of a property management tool presented herein.
Figure 11B:
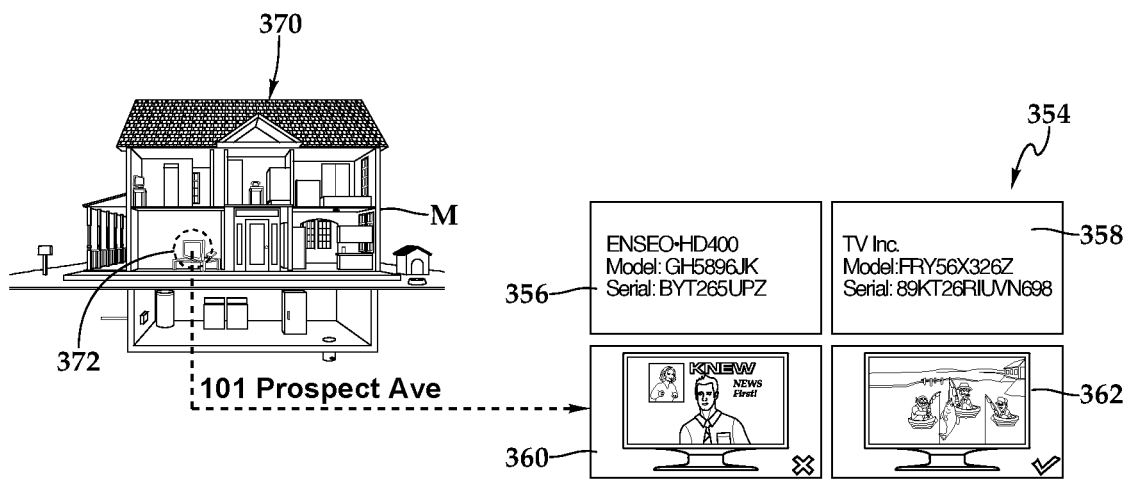
FIG. 11B is a schematic diagram depicting one embodiment of a map representation of a home within the residential communities presented in FIG. 11A.

Referring now to FIG. 11A and FIG. 11B, in one implementation, property monitoring and optimization is provided in the form of a database, or as shown, in the map view 42 of the residential community O including a graphical presentation 370 of multiple homes M, wherein particular homes with set-top box data historically and in substantially real time permits a user or manager to select the desired information and make optimal content and advertising decisions. The multiple homes in the residential community are labeled 101, 102, 103, 104, 105, and 106 Prospect Ave.

In particular, color-coding and hue assignment adds additional understanding and visibility into viewer consumption preferences as well as use of the set-top box and network programming habits. In FIGS. 11A and 11B, by collecting the substantially real time and historic set-top box data from the field, a map may be shown depicting all rooms with television ON, for example. In particular, living rooms at 101 Prospect Ave, 103 Prospect Ave, and 104 Prospect Ave are highlighted (element 372) to show the television is ON and to offer the opportunity to inspect the interposed content in terms of viewership.

As shown, by way of example, the status of television viewing is been shown, including a living room at 101 Prospect Ave, and is being examined as each highlighted room (see element 372) has television ON. As shown, the graphical representation of the home M at 101 Prospect Ave is annotated with the information group 354. For example, as previously discussed, the information 356 is based on identification data that details the model and serial number of the set-top box 12 associated with the living room at 101 Prospect Ave. Also, included in the annotation is information 358, which provides details on the physical connection with the display 14 associated with the set-top box 12 of living room at 101 Prospect Ave. Information 360 shows details on a particular recently viewed channel and commercial advertising content where viewership was not completed. Information 362 annotates the map view 42 with a commercial advertising content on the channel that is being viewed in full by the viewer or resident, based on the set-top box data 40 received from the set-top box 12 at the server 38. That is, in some embodiments, once the set-top box data 40 is captured, the set-top box 12 is directly uploaded to the server 38 and a database and then associated with the rooms shown on the map view 42. Management uses the map view 42 to gather real time information about the status of the rooms and properties and reports on content, such as advertising, viewership. To view the set-top box data 40 captured from each set-top box 12 in each room, the map view users can select a room from the map and appropriately click or tap on the rooms and then select the set-top box data 40 or other processing operations requested.

The system presented herein provides for the management of set-top box assets and accounts across residential communities. In one embodiment, a web-hosted, cloud-based property monitoring and troubleshooting tool is furnished that provides a graphical presentation of the properties with historic and real time room and equipment status. As mentioned, historic set-top box data may be viewed by property or properties, room or room, with user selectable constraints such as data and time.

Figure 12:
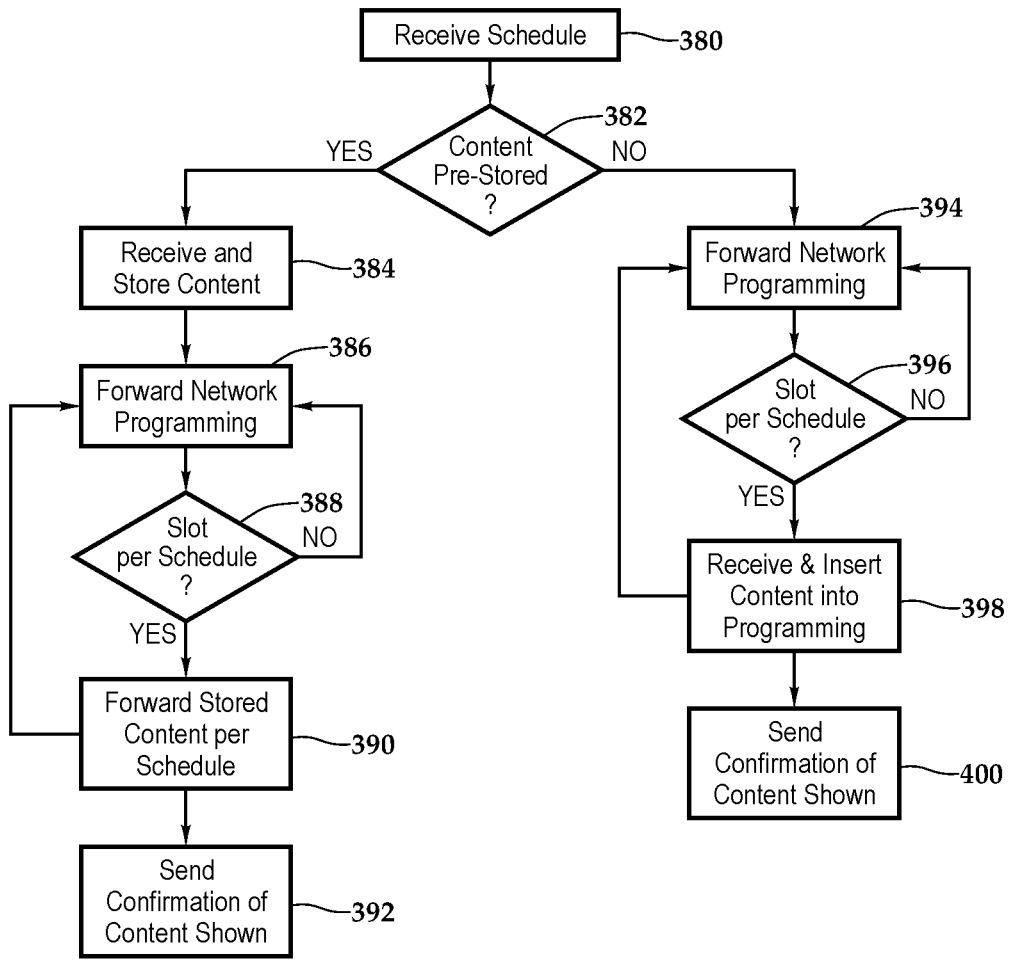
FIG. 12 is a flow chart depicting one embodiment of a method for providing a set-top box having enhanced content according to the teachings presented herein.

FIG. 12 depicts one embodiment of a method for providing enhanced content, according to the teachings presented herein. The methodology starts at block 380 when the set-top box receives a schedule of the available time slots. In one embodiment, the schedule may also include the particular content to be displayed for each time slot. At decision block 382, if the content is pre-stored at the set-top box, then the methodology advances to block 384, where content that will be utilized within a certain period of time is received and stored at the set-top box. At block 386, network programming is received at the set-top box and forwarded to the display. At decision block 388, if the scheduled time slot has not been detected, then the methodology returns to block 386 and continues in a loop between decision block 388 and block 386 until the scheduled time slot is detected by way of signaling data. At block 390, the stored content is forwarded to the display in the stream of the network programming prior to the network programming continuing at block 392 and confirmation of the content shown is forwarded from the set-top box to the server.

Returning to decision block 382, if the content is not pre-stored, then in one implementation, the methodology advances to block 394 where network programming is received at the set-top box and forwarded to the display. At decision block 396, if the scheduled time slot has not been detected, then the methodology returns to block 394 and continues in a loop between decision block 396 and block 394 until the scheduled time slot is detected by way of signaling data. At block 398, the content to be inserted into the network programming, by way of splicing, for example, is forwarded to the display in the stream of the network programming prior to the network programming continuing at block 400, where confirmation of content displayed is sent from the set-top box to the server.

Figure 13:
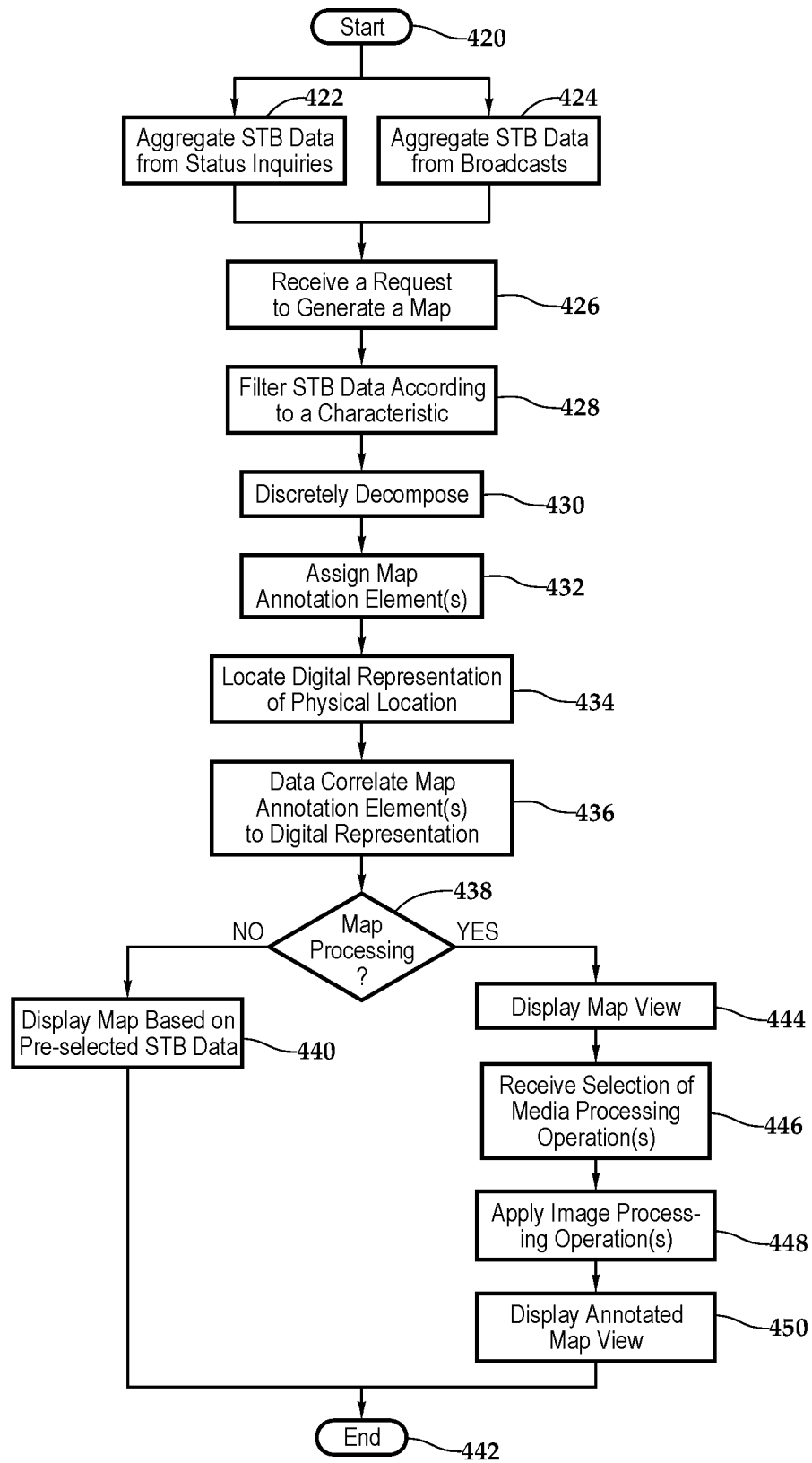
FIG. 13 is a flow chart depicting one embodiment of a method for providing hospitality property management according to the teachings presented herein.

Referring now to FIG. 13, one embodiment of a method for utilizing property management tools for the operation, control, and oversight of hospitality properties, such as lodging establishments, motels, or hotels, for example, is depicted. The methodology starts at block 420 and progresses through block 422 and block 424 where, respectively set-top box data is aggregated from status inquiries from the server to the set-top boxes and aggregated from set-top boxes broadcasting the set-top box data. At block 426, the server receives a request to generate a map view of a particular hospitality property. At block 428, the server filters the aggregated set-top box data according to a characteristic or characteristics. At blocks 430 and 432, the set-top box data is discretely decomposed and assigned annotation elements. At block 434, the digital representation of the physical location, e.g., the hospitality property, is located and at block 436, the data correlation of the map annotation elements to the digital representation occurs.

At decision block 438, if the map processing including any applied annotations are based on a pre-selected or pre-stored or pre-defined criteria, then the methodology advances to block 440 where the appropriate map view is rendered prior to block 442, the methodology ending. On the other hand, at decision block 338, if user input will be sought on the map view and annotations, then the methodology displays the map view at block 444. Then at block 446, the server receives selection of media processing operations from the user and then applies the image processing operations at block 448. The media processing operations may include, for example, selecting the media to be displayed and various luminance and color properties and such to provide further visibility into the map view. At block 450, the map view with annotations is rendered prior to the methodology ending at block 442.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A system for content management, the system comprising:
   a set-top box located in a room at a hospitality establishment having a plurality of rooms, the set-top box including:
      a housing securing a signal input, a signal output, a processor, memory, and storage therein,
      a busing architecture communicatively interconnecting the signal input, the signal output, the processor, the memory, and the storage,
      the signal input configured to receive a source signal from an external source, the source signal including a stream of network programming having a plurality of time slots interposed therein,
      the signal output configured to forward a fully tuned signal to a display,
      the memory accessible to the processor, the memory including processor-executable instructions that, when executed, cause the processor to:
         receive content relative to a designated time slot from a server,
         store the content at the set-top box,
         receive network programming on the signal input and forward the network programming to the display via the signal output,
         interpose the content at the designated time slot within the network programming and forward the interposed content to the display via the signal output,
         send set-top box data to the server, the set-top box data including confirmation of the displayed interposed content to the server, and
         following the forwarding of the interposed content, receive network programming on the signal input and forward the network programming to the display via the signal output; and
   a map view of the hospitality establishment based on obtained map data, the map view including a graphical representation of the room and a plurality of other room at the hospitality establishment, the graphical representation of the room being annotated with at least a portion of the set-top box data, the set-top box data including the confirmation of the displayed interposed content.

2. The system as recited in claim 1, wherein the confirmation of the displayed interposed content to the server further comprises data relative to full viewing of the interposed content.

3. The system as recited in claim 1, wherein the confirmation of the displayed interposed content to the server further comprises data relative to at least one of no viewing of the interposed content and partial viewing of the interposed content.

4. The system as recited in claim 1, wherein the content further comprises an advertisement.

5. The system as recited in claim 1, wherein the content further comprises a first advertisement substituting for a second advertisement within the network programming.

6. The system as recited in claim 1, wherein the content further comprises non-advertising content.

7. The system as recited in claim 1, wherein the content further comprises non-advertising content relating to the hospitality establishment.

8. The system as recited in claim 1, wherein the hospitality establishment is selected from the group consisting of furnished multi-family residences, dormitories, lodging establishments, hotels, hospitals, and multi-unit environments.

9. The system as recited in claim 1, wherein the plurality of time slots further comprise a plurality of local advertising time slots.

10. The system as recited in claim 1, wherein the content further comprises a schedule with the time of each of the plurality of time slots and identification of particular content associated with each of the plurality of time slots.

11. The system as recited in claim 1, wherein the processor-executable instructions of the set-top box further comprise instructions that, when executed, cause the processor to interpose, by way of splicing, the content at the designated time slot within the network programming and forward the interposed content to the display via the signal output.

12. The system as recited in claim 1, wherein the server generates the map view of the hospitality establishment.

13. The system as recited in claim 1, wherein the map view further comprises a 3-D perspective view of the hospitality establishment.

14. The system as recited in claim 1, wherein the map view further comprises a multi-floor view of the hospitality establishment.

15. The system as recited in claim 1, wherein the map view further comprises a 2-D top plan view of at least a portion the hospitality establishment.

16. The system as recited in claim 1, wherein the map view further comprises a view of a floor of the hospitality establishment.

17. A system for content management, the system comprising:
a set-top box located in a room, the set-top box including:
a housing securing a signal input, a signal output, a processor, memory, and storage therein,
a busing architecture communicatively interconnecting the signal input, the signal output, the processor, the memory, and the storage,
the signal input configured to receive a source signal from an external source, the source signal including a stream of network programming having a plurality of time slots interposed therein,
the signal output configured to forward a fully tuned signal to a display,
the memory accessible to the processor, the memory including processor-executable instructions that, when executed, cause the processor to:
receive content relative to a designated time slot from a server,
store the content at the set-top box,
receive network programming on the signal input and forward the network programming to the display via the signal output,
interpose the content at the designated time slot within the network programming and forward the interposed content to the display via the signal output,
send set-top box data to the server, the set-top box data including confirmation of the displayed interposed content to the server, and
following the forwarding of the interposed content, receive network programming on the signal input and forward the network programming to the display via the signal output; and
a map view based on obtained map data, the map view including a graphical representation of the room, the graphical representation of the room being annotated with at least a portion of the set-top box data, the set-top box data including the confirmation of the displayed interposed content.

18. The system as recited in claim 16, wherein the confirmation of the displayed interposed content to the server further comprises data relative to full viewing of the interposed content.

19. The system as recited in claim 16, wherein the confirmation of the displayed interposed content to the server further comprises data relative to at least one of no viewing of the interposed content and partial viewing of the interposed content.

20. The system as recited in claim 16, wherein the content further comprises an advertisement.

21. A system for content management, the system comprising:
a set-top box including:
a housing securing a signal input, a signal output, a processor, memory, and storage therein,
a busing architecture communicatively interconnecting the signal input, the signal output, the processor, the memory, and the storage,
the signal input configured to receive a source signal from an external source, the source signal including a stream of network programming having a plurality of time slots interposed therein,
the signal output configured to forward a fully tuned signal to a display,
the memory accessible to the processor, the memory including processor-executable instructions that, when executed, cause the processor to:
receive content relative to a designated time slot from a server,
store the content at the set-top box,
receive network programming on the signal input and forward the network programming to the display via the signal output,
interpose the content at the designated time slot within the network programming and forward the interposed content to the display via the signal output,
send set-top box data to the server, the set-top box data including confirmation of the displayed interposed content to the server, and
following the forwarding of the interposed content, receive network programming on the signal input and forward the network programming to the display via the signal output; and
a map view based on obtained map data, the map view being annotated with at least a portion of the set-top box data, the set-top box data including the confirmation of the displayed interposed content.

\* \* \* \* \*